United States Patent
Peri et al.

(10) Patent No.: US 11,348,320 B2
(45) Date of Patent: May 31, 2022

(54) OBJECT IDENTIFICATION UTILIZING PAIRED ELECTRONIC DEVICES

(71) Applicant: Samsung Electronics Company, Ltd., Suwon-si (KR)

(72) Inventors: Christopher A. Peri, Mountain View, CA (US); Dotan Knaan, Mountain View, CA (US)

(73) Assignee: SAMSUNG ELECTRONICS COMPANY, LTD., Suwon (KR)

( * ) Notice: Subject to any disclaimer, the term of this patent is extended or adjusted under 35 U.S.C. 154(b) by 0 days.

(21) Appl. No.: 17/014,202

(22) Filed: Sep. 8, 2020

(65) Prior Publication Data

US 2021/0312713 A1    Oct. 7, 2021

Related U.S. Application Data

(60) Provisional application No. 63/004,355, filed on Apr. 2, 2020.

(51) Int. Cl.
*G06T 19/00* (2011.01)
*G06T 7/20* (2017.01)
(Continued)

(52) U.S. Cl.
CPC ........ *G06T 19/006* (2013.01); *G02B 27/0172* (2013.01); *G06T 7/20* (2013.01); *H04L 67/36* (2013.01); *G02B 2027/0138* (2013.01)

(58) Field of Classification Search
None
See application file for complete search history.

(56) References Cited

U.S. PATENT DOCUMENTS 10,244,228 B2  3/2019  Millett
10,452,133 B2  10/2019  Miller
(Continued)

FOREIGN PATENT DOCUMENTS

KR   20090040839   4/2009
KR   10-2014-0090263 A   7/2014
(Continued)

OTHER PUBLICATIONS

International Search Report and Written Opinion for International Application No. PCT/KR2021/004100, dated Jul. 7, 2021.

*Primary Examiner* — Frank S Chen
(74) *Attorney, Agent, or Firm* — Baker Botts L.L.P.

(57) ABSTRACT

A method implemented by an extended reality (XR) display device capturing, by an optical sensor, an image portraying a number of objects within an environment and analyzing the image to identify a tracking pattern corresponding to a first object. The first object is an external electronic device associated with the XR display device. The method further includes generating a first map of the environment based on the image, in which a relative location of the external electronic device within the environment with respect to the XR display device is determined for the first map based on the tracking pattern. The method further includes accessing a final map of the environment based on the first map of the environment and a second map of the environment generated with respect to the relative location.

30 Claims, 9 Drawing Sheets

(51) Int. Cl.
*H04L 67/75* (2022.01)
*G02B 27/01* (2006.01)

(56) References Cited

U.S. PATENT DOCUMENTS

| | | |
|---|---|---|
| 10,547,974 B1 | 1/2020 | Pollefeys |
| 2012/0162412 A1* | 6/2012 | Kim .......................... G06T 7/11 348/135 |
| 2016/0117822 A1* | 4/2016 | Yii ........................... G06T 7/77 382/107 |
| 2016/0170603 A1 | 6/2016 | Bastien |
| 2017/0011553 A1 | 1/2017 | Chen |
| 2017/0140552 A1 | 5/2017 | Woo |
| 2017/0185823 A1 | 6/2017 | Gold |
| 2017/0244811 A1 | 8/2017 | Mckenzie |
| 2017/0357333 A1 | 12/2017 | Balan |
| 2018/0077345 A1* | 3/2018 | Yee .................... G06K 9/00724 |
| 2019/0243472 A1 | 8/2019 | Stafford |
| 2019/0297318 A1 | 9/2019 | Fateh |
| 2021/0065455 A1* | 3/2021 | Beith .................... G06F 3/0426 |

FOREIGN PATENT DOCUMENTS

| | | |
|---|---|---|
| KR | 10-2018-0122797 | 11/2018 |
| WO | 2009/054619 | 4/2009 |

* cited by examiner

OBJECT IDENTIFICATION UTILIZING PAIRED ELECTRONIC DEVICES

PRIORITY

This application claims the benefit under 35 U.S.C. § 119(e) of U.S. Provisional Patent Application No. 63/004,355, filed 2 Apr. 2020, which is incorporated herein by reference.

TECHNICAL FIELD

This disclosure relates generally to electronic devices, and, more particularly, to object detection and identification utilizing paired electronic devices.

BACKGROUND

An extended reality (XR) system may generally include a computer-generated environment and/or a real-world environment that includes at least some XR artifacts. Such an XR system or world and associated XR artifacts typically include various applications (e.g., video games), which may allow users to utilize these XR artifacts by manipulating their presence in the form of a computer-generated representation (e.g., avatar). In typical XR systems, image data may be rendered on, for example, a robust head-mounted display (HMD) that may be coupled through a physical wired connection to a base graphics generation device responsible for generating the image data. However, in some instances, in which the HMD includes, for example, lightweight XR glasses or spectacles as opposed to more robust headset devices, the XR glasses or spectacles may, in comparison, include reduced processing power, low-resolution/low-cost optical sensors, and/or relatively simple tracking optics. This may often preclude such devices from performing complex computations, such as 3D depth map generation that users have otherwise come to expect as part of their XR experience. It may be thus useful to provide techniques to improve lightweight XR systems.

DESCRIPTION OF EXAMPLE EMBODIMENTS

Figure 1:
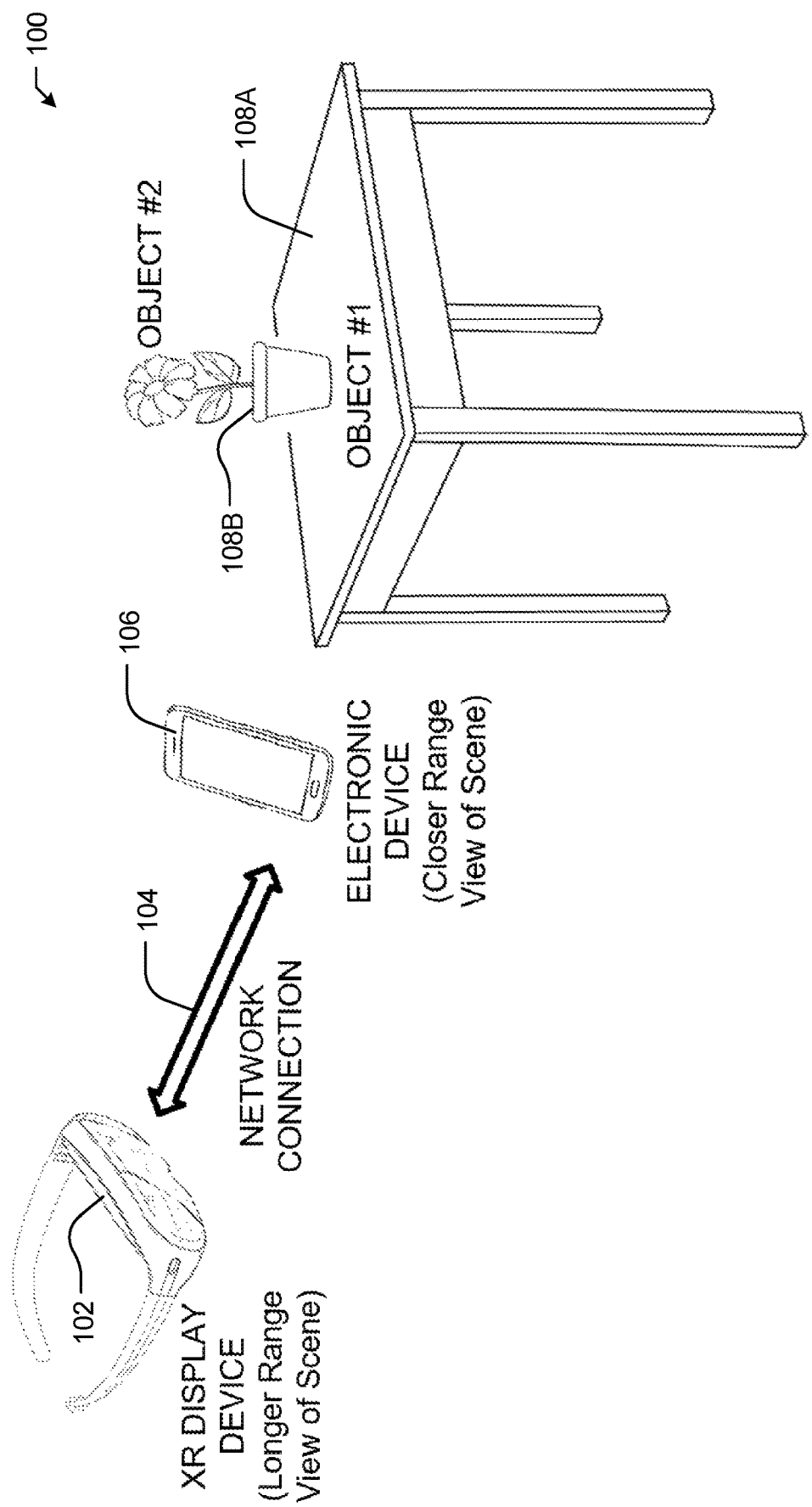
FIG. 1 illustrates an example extended reality (XR) environment.

The present embodiments are directed toward receiving a final image and depth map based on a first map and second map for creating and refining 3D point clouds and detecting and recognizing objects within an XR environment. In particular embodiments, an extended reality (XR) display device may capture, by one or more optical sensors of an XR display device, one or more images portraying a number of objects within the environment. In particular embodiments, the XR display device may then analyze the one or more images to identify a tracking pattern corresponding to a first object of the number of objects. For example, in particular embodiments, the first object may include an external electronic device associated with the XR display device. In particular embodiments, the XR display device may then generate a first map of the environment based on the one or more images, in which a relative location of the external electronic device within the environment with respect to the XR display device is determined for the first map based on the tracking pattern.

For example, in particular embodiments, the XR electronic device may generate the first map of the environment utilizing a synchronous localization and mapping (SLAM) process or other point cloud mapping process. In particular embodiments, the first map may include a first pose and a first transformation corresponding to the XR display device. In particular embodiments, the XR display device may then access a final map of the environment based on the first map of the environment and a second map of the environment generated with respect to the relative location. For example, in particular embodiments, the final map may be based on the first map and a second map of the environment generated with respect to the relative location. In particular embodiments, the second map may include a second pose and a second transformation corresponding to the external electronic device. In particular embodiments, the first map may include a lower resolution as compared to the second map. In this way, even in the case in which XR display device includes only reduced processing power, low-resolution/low-cost optical sensors, and/or simplified tracking optics, the present techniques may nevertheless allow for accurate and precise object detection and identification by utilizing the electronic device to perform the more computationally expensive 3D pose and depth calculations and for simply sharing a finalized 3D map of the environment between the electronic device and the XR display device.

In particular embodiments, the present embodiments are further directed toward generating a final image and depth map based on a first map and second map for creating and refining 3D point clouds and detecting and recognizing objects within an XR environment. In particular embodiments, the electronic device may display, on a display of the electronic device, a tracking pattern. For example, in particular embodiments, the tracking pattern may include wireless connection information for coupling the electronic device to an XR display device. In particular embodiments, the tracking pattern may include a pattern displayed within a center portion of a display area of the display of the electronic device. In particular embodiments, the tracking pattern may further include one or more sub-patterns displayed within a perimeter portion of the display area of the display of the electronic device. In particular embodiments, the electronic device may then be coupled to the electronic device to the XR display device based on the wireless connection information from the tracking pattern. In particular embodiments, the electronic device may receive a first map of an environment from the external XR display device. For example, in particular embodiments, the first map may indicate a relative location of the electronic device and locations of one or more objects within the environment with respect to the external XR display device. In particular embodiments, the first map may include a first pose and a first transformation corresponding to the external XR display device.

In particular embodiments, the electronic device may then generate a second map of the environment based on one or more images captured by one or more optical sensors of the electronic device. For example, in particular embodiments, the second map may indicate locations of the one or more objects within the environment with respect to the electronic device. In particular embodiments, the second map may include a second pose and a second transformation corresponding to the electronic device. In particular embodiments, the electronic device may then generate a final map of the environment based on the first map and the second map with respect to the relative location. For example, in particular embodiments, the electronic device may generate the final map of the environment may perform, for each of the one or more objects, one or more triangulation calculations based on the first map and the second map to determine a first pose and a second pose of the respective object. In this way, even in the case in which XR display device includes only reduced processing power, low resolution optical sensors, and/or simplified tracking optics, the present techniques may nevertheless allow for accurate and precise object detection and identification by utilizing the electronic device to perform the more computationally expensive 3D pose and depth calculations and for simply sharing a finalized 3D map of the environment between the electronic device and the XR display device.

As used herein, "extended reality" may refer to a form of electronic-based reality that has been manipulated in some manner before presentation to a user, including, for example, virtual reality (VR), augmented reality (AR), mixed reality (MR), hybrid reality, simulated reality, immersive reality, holography, or any combination thereof. For example, "extended reality" content may include completely computer-generated content or partially computer-generated content combined with captured content (e.g., real-world images). In some embodiments, the "extended reality" content may also include video, audio, haptic feedback, or some combination thereof, any of which may be presented in a single channel or in multiple channels (such as stereo video that produces a three-dimensional (3D) effect to the viewer). Further, as used herein, it should be appreciated that "extended reality" may be associated with applications, products, accessories, services, or a combination thereof, that, for example, may be utilized to create content in extended reality and/or utilized in (e.g., perform activities) in extended reality. Thus, "extended reality" content may be implemented on various platforms, including a head-mounted device (HMD) connected to a host computer system, a standalone HMD, a mobile device or computing system, or any other hardware platform capable of providing extended reality content to one or more viewers. Furthermore, as used herein, "generate", "generating", "generate a map", or "map generation" may be broadly used to refer to one or more maps or mapping processes that may be created by the XR display device or electronic device based on one or more submaps, captured location data, point cloud data, or other similar data and utilized to determine, for example, a pose or localization of one or more objects within an environment. Likewise, as used herein, "generate", "generating", "generate a map", or "map generation" may be broadly used to refer to one or more maps or mapping processes that may be stored, accessed, and updated or augmented by the XR display device or electronic device based on one or more submaps, captured location data, point cloud data, or other similar data and utilized to determine, for example, a pose or localization of one or more objects within an environment. Lastly, as used herein, "optical sensors" may refer to one or more cameras, one or more infrared (IR) sensors, one or more depth sensors, one or more time-of-flight (ToF) sensors, one or more thermal imaging sensors, one or more ultrasonic imaging sensors, one or more ultraviolet (UV) sensors, one or more X-ray sensors, one or more gamma-ray sensors, one or more microwave imaging sensors, one or more millimeter wave imaging sensors, one or more radar sensors, or other optical sensors or imaging sensors that may be useful in capturing images of a real-world environment (e.g., indoor environments, outdoor environments, obnubilated environments, and so forth), an XR environment, and/or more one or more objects appearing within the real-world or XR environments.

FIG. 1 illustrates an example extended reality (XR) environment 100, in accordance with presently disclosed embodiments. In particular embodiments, the XR environment 100 may include an XR display device 102, a network 104, an electronic device 106, and one or more objects 108A (e.g., "Object #1") and 108B ("Object #2"). In particular embodiments, a user may wear the XR display device 102 that may display visual extended reality content to the user. The XR display device 102 may include an audio device that may provide audio extended reality content to the user. In particular embodiments, the XR display device 102 may include one or more optical sensors which can capture images and videos of the XR environment 100, such as the one or more objects 108A (e.g., "Object #1") and 108B ("Object #2"). The XR display device 102 may include an eye tracking system to determine a distance of the user. In particular embodiments, the XR display device 102 may include a lightweight head-mounted display (HMD) (e.g., goggles, eyeglasses, spectacles, a visor, and so forth). In particular embodiments, the XR display device 102 may also include a non-HMD device, such as a lightweight handheld display device or one or more laser projecting spectacles (e.g., spectacles that may project a low-powered laser onto a user's retina to project and display image or depth content to the user).

In particular embodiments, the XR display device 102 may be paired to the electronic device 106 via one or more networks 104 (e.g., a wired network, a wireless network, a cloud-based network, and so forth). In particular embodiments, the electronic device 106 may include, for example, a standalone host computing device, a mobile electronic device (e.g., mobile phone, handheld electronic device), or any other hardware platform that may be capable of capturing capture images and videos of the XR environment 100, such as the one or more objects 108A (e.g., "Object #1") and 108B ("Object #2"), and providing extended reality content to the XR display device 102. In particular embodiments, the one or more objects 108A (e.g., "Object #1") and 108B ("Object #2") may include one or more captured scene objects corresponding to the one or more objects 108A (e.g., "Object #1") and 108B ("Object #2"), or a set of 3D feature points or data points that may represent the one or more objects 108A (e.g., "Object #1") and 108B ("Object #2"). Thus, as it may be appreciated, in particular embodiments in which the XR display device 102 includes lightweight devices, such as goggles, eyeglasses, spectacles, a visor, and so forth, the XR display device 102 may, in comparison to the electronic device 106, include reduced processing power, low-resolution/low-cost optical sensors, and/or relatively simple tracking optics.

Figure 2:
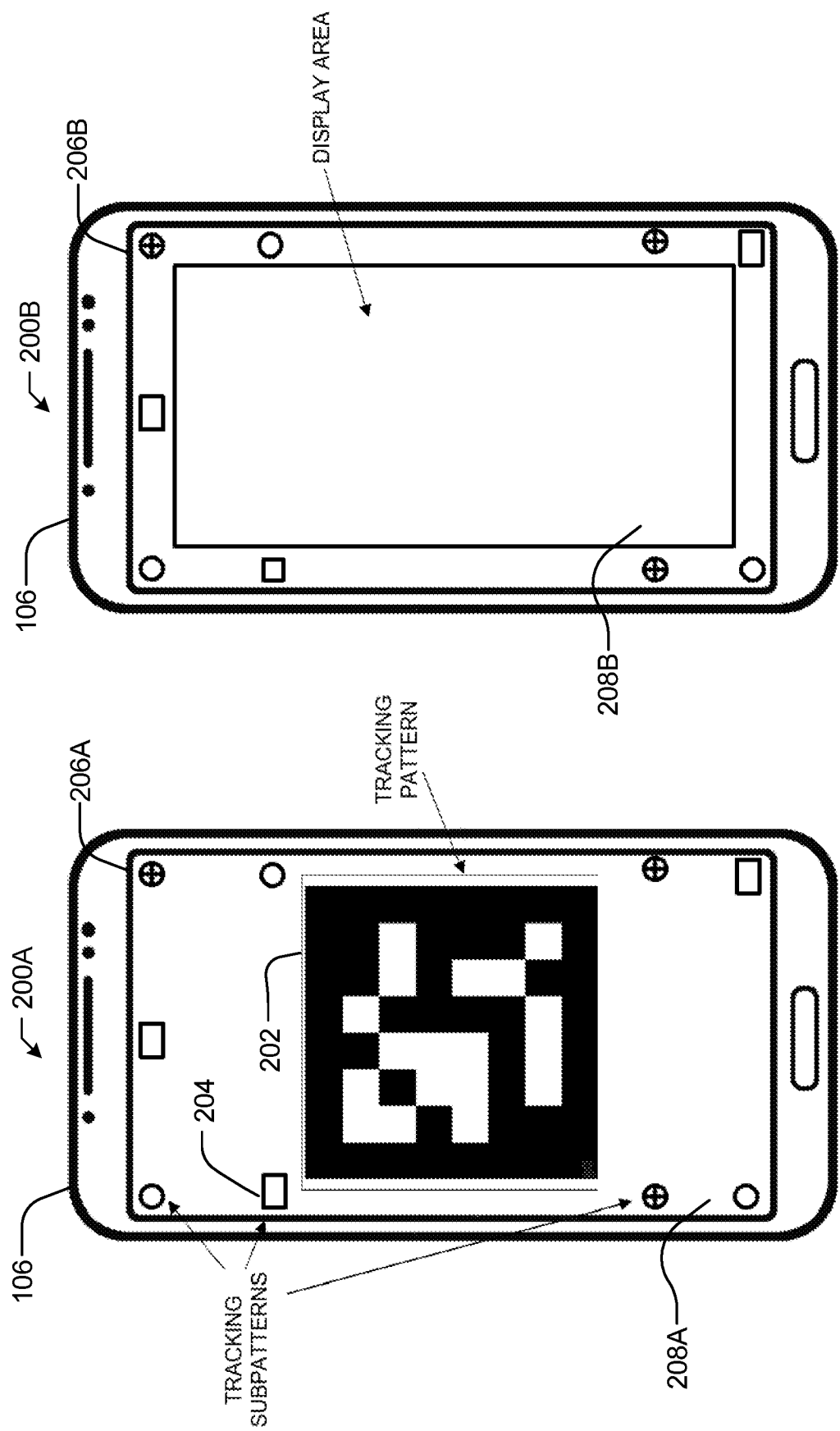
FIGS. 2A and 2B illustrate electronic devices including a tracking pattern for allowing the electronic devices to be tracked by an XR display device.

FIGS. 2A and 2B illustrate electronic devices 200A and 200B including a tracking pattern for allowing the electronic devices 200A and 200B to be tracked by the XR display device 102. As depicted in FIG. 2A, in particular embodiments, the electronic device 200A may include, for example, a tracking pattern 202 (e.g., sizable tracking pattern) may that may be displayed within a center portion of a display area 208A of the display 206 of the electronic device 200A. In particular embodiments, the tracking pattern 202 (e.g., sizable tracking pattern) may include, for example, a quick response (QR) code, a barcode (e.g., universal product code (UPC)), a binary code, an image (e.g., a facial image), a signature, a randomly generated code, a Morse code, or other unique identifier that may be suitably identified by the XR display device 102 in tracking the electronic device 200A. In particular embodiments, the tracking pattern 202 (e.g., sizable tracking pattern) may also include wireless connection information for pairing (e.g., communicatively coupling) the XR display device 102 to the electronic device 200A, 200B. Similarly, as depicted in FIGS. 2A and 2B, in particular embodiments, the electronic devices 200A and 200B may further include, for example, a tracking subpatterns 204 (e.g., reduced-size tracking patterns) may that may be displayed within a perimeter portion of a display areas 208A and 208B of the displays 206 of the electronic devices 200A and 200B.

In particular embodiments, the tracking subpatterns 204 (e.g., reduced-size tracking patterns) may include, for example, one or more subcomponents of the QR code, the barcode, the binary code, the image (e.g., partial facial image), the signature (e.g., initialized), the random code, or other unique identifier corresponding to, for example, the tracking pattern 202 (e.g., sizable tracking pattern). In particular embodiments, the tracking subpatterns 204 (e.g., reduced-size tracking patterns) may be provided to replace the tracking pattern 202 (e.g., sizable tracking pattern) in the case in which, for example, image content is being displayed within the display areas 208A and 208B of the displays 206 of the electronic devices 200A and 200B (e.g., so as to not compromise the trackability of the electronic devices 200A and 200B within the XR environment 100 while the user is utilizing the electronic devices 200A and 200B to display image content or other suitable user content). For example, in particular embodiments, once the XR display device 102 and the electronic device 200A, 200B are aware of the relative locations of each other with the global space of the XR environment 100, the electronic device 200A, 200B may switch from displaying the tracking pattern 202 (e.g., sizable tracking pattern) to displaying the tracking subpatterns 204 (e.g., reduced-size tracking patterns).

In particular embodiments, when the XR display device 102 captures one or more images of the XR environment 100, the XR display device 102 may then analyze the one or more images to identify the tracking pattern 202 (e.g., sizable tracking pattern) and/or the tracking subpatterns 204 (e.g., reduced-size tracking patterns), and, by extension, may be utilized to identify and track the electronic device 200A, 200B as the user moved throughout the XR environment 100. For example, in particular embodiments, by tracking the electronic device 200A, 200B, the XR display device 102 and the electronic device 200A, 200B may maintain spatial awareness with respect to each other to establish and maintain a unified global space (e.g., unified 3 dimensional (3D) space). Indeed, as will be further appreciated with respect to FIGS. 3, 4, 5A, and 5B, by maintaining spatial awareness, the XR display device 102 and the electronic device 200A, 200B may readily share and unify spatial mapping (e.g., point cloud mapping, semantic mapping, and so forth), object detection information, object identification information, pattern recognition information (e.g., scene comprehension of the XR environment 100), and so forth.

Figure 3:
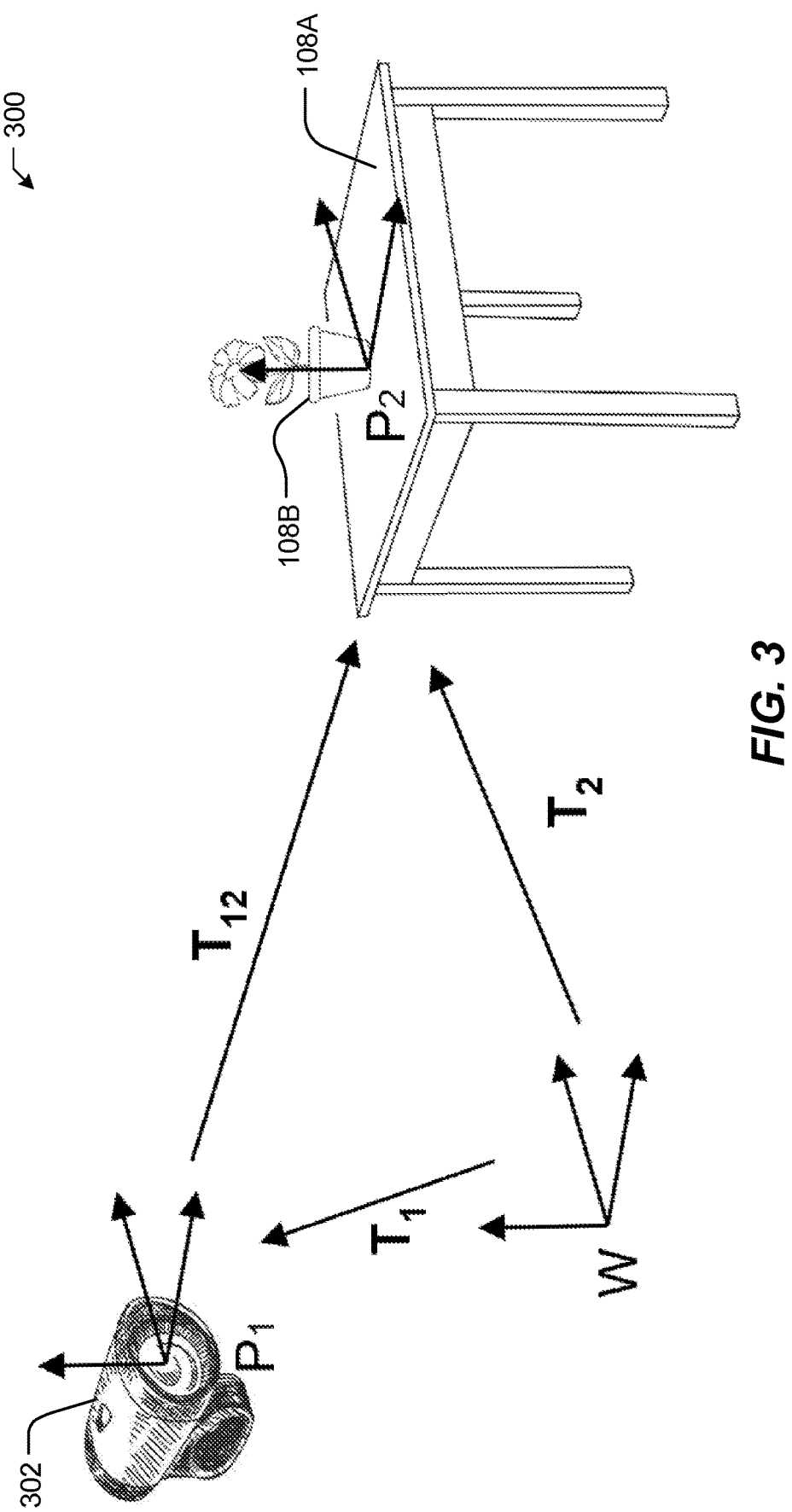
FIG. 3 illustrates is a world coordinate and optical sensor system.

FIG. 3 illustrates a world coordinate and optical sensor system 300, in accordance with the presently disclosed embodiments. In particular embodiments, the world coordinate system W may include a fixed coordinate system (e.g., 3D space) that may be preset. In particular embodiments, the location and orientation of the world coordinate system W may be programmed based on one or more developer-specific preferences. For example, in particular embodiments, the world coordinate system W may be set to the position and orientation of the world coordinate system W to match a position and orientation of the optical sensor system 302 at a particular time at which tracking commences or may be set, for example, to align with gravity. In particular embodiments, the world coordinate system W may be fixed, and thus each determined pose (e.g., optical sensor system 302 pose, object 108A pose, object 108B pose, and so forth) may be determined relative to the world coordinate system W. For example, as depicted by FIG. 3, in particular embodiments, the optical sensor 302 may include an optical sensor pose $P_1$ and the object 108B ("Object #2") may include an object pose $P_2$. In particular embodiments, the optical sensor pose $P_1$ and the object pose $P_2$ may each include, for example, a rotation R and a translation t relative to the world coordinate system W.

For example, in particular embodiments, the transformation $T_1$ and the transformation $T_2$ may each include, for example, a matrix that may be composed of a rotation R and t (e.g., in which the rotation R is expressed as a matrix and translation t may be expressed as a vector: T[R|t]). In particular embodiments, once the optical sensor pose $P_1$ and the object pose $P_2$ are calculated relative to the world coordinate system W, the optical sensor pose $P_1$ and the object pose $P_2$ may be then utilized to calculate the relative transformation from the optical sensor system 302 to the object 108B, and more particularly from the optical sensor pose $P_1$ to the object pose $P_2$. For, example, in particular embodiments, the transformation $T_1$ may transform the world coordinate system W to the optical sensor pose $P_1$ and the transformation $T_2$ may transform the world coordinate system W to the object pose $P_2$. Accordingly, based on matrix arithmetic, the transformation $T_{12}$ from the optical sensor pose $P_1$ to the object pose $P_2$ may be expressed as: $T_1^{-1}T_2$ (e.g., where the transformation $T^{-1}$ is the inverse of the transformation T). In this way, the transformation $T_{12}$ may yield an expression of the object pose $P_2$ relative to the world coordinate system W and the optical sensor pose $P_1$.

Figure 4:
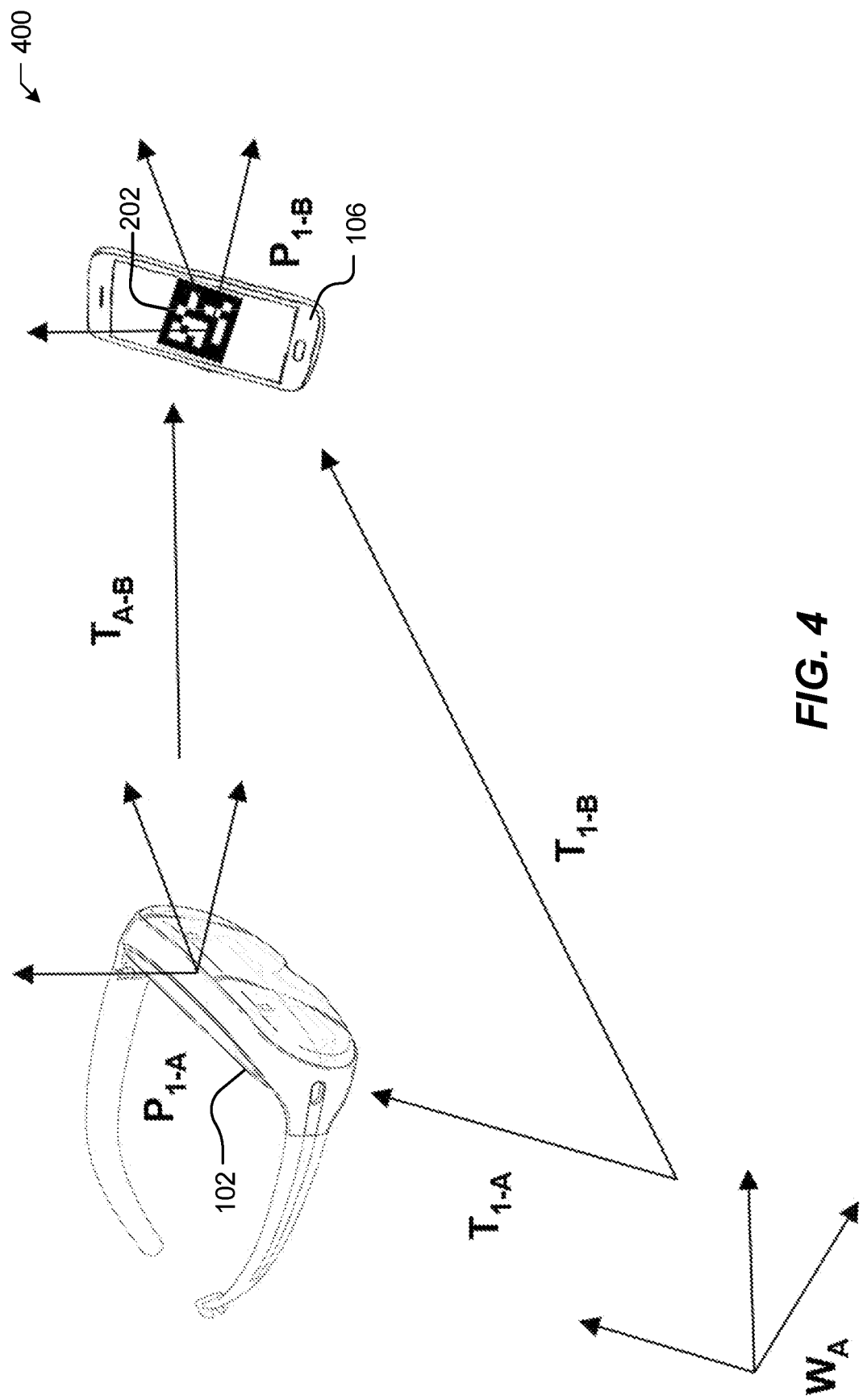
FIG. 4 illustrates a world coordinate, XR display device, and electronic device system.

FIG. 4 illustrates a world coordinate, XR display device, and electronic device system 400, in accordance with the presently disclosed embodiments. In particular embodiments, the XR display device 102 may generate a first map of the environment utilizing a synchronous localization and mapping (SLAM) algorithm or other point cloud mapping algorithm and the electronic device 106 may generate a second map of the environment utilizing a SLAM. For example, in particular embodiments, the XR display device 102 may generate the first map, which may include a XR display device pose $P_{1-A}$ and XR display device transformation $T_{1-A}$ corresponding to the XR display device 102 determined based on, for example, a world coordinate system $W_A$. Similarly, in particular embodiments, the electronic device 102 may generate the second map, which may include an electronic device pose $P_{1-B}$ and electronic device transformation $T_{1-A}$ corresponding to the electronic device 106 determined based on, for example, a world coordinate system $W_B$. In particular embodiments, the first map generated by the XR display device 102 may include a lower resolution (e.g., a lower spatial resolution) as compared to the second map generated by the electronic device 106.

In particular embodiments, in order to integrate and combine the first map generated by the XR display device 102 and the second map generated by the electronic device 106, the present techniques may include determining, for example, one or transformations between the world coordinate system $W_A$ and the world coordinate system $W_B$. For example, in particular embodiments, the XR display device 102 may detect and track the relative location of the electronic device 106 with respect to XR display device 102 based on one or more image captures of the tracking pattern 202 displayed on the electronic device 106. Once the XR display device 102 determines the relative location of the electronic device 106 with respect to itself (e.g., and vice-versa), based on matrix arithmetic, the transformation $T_{A-B}$ from the XR display device 102 to the electronic device 106 may be then expressed as: $T_{A-B}=T^{-1}_{1-A}T_{1-B}$.

Figure 5A:
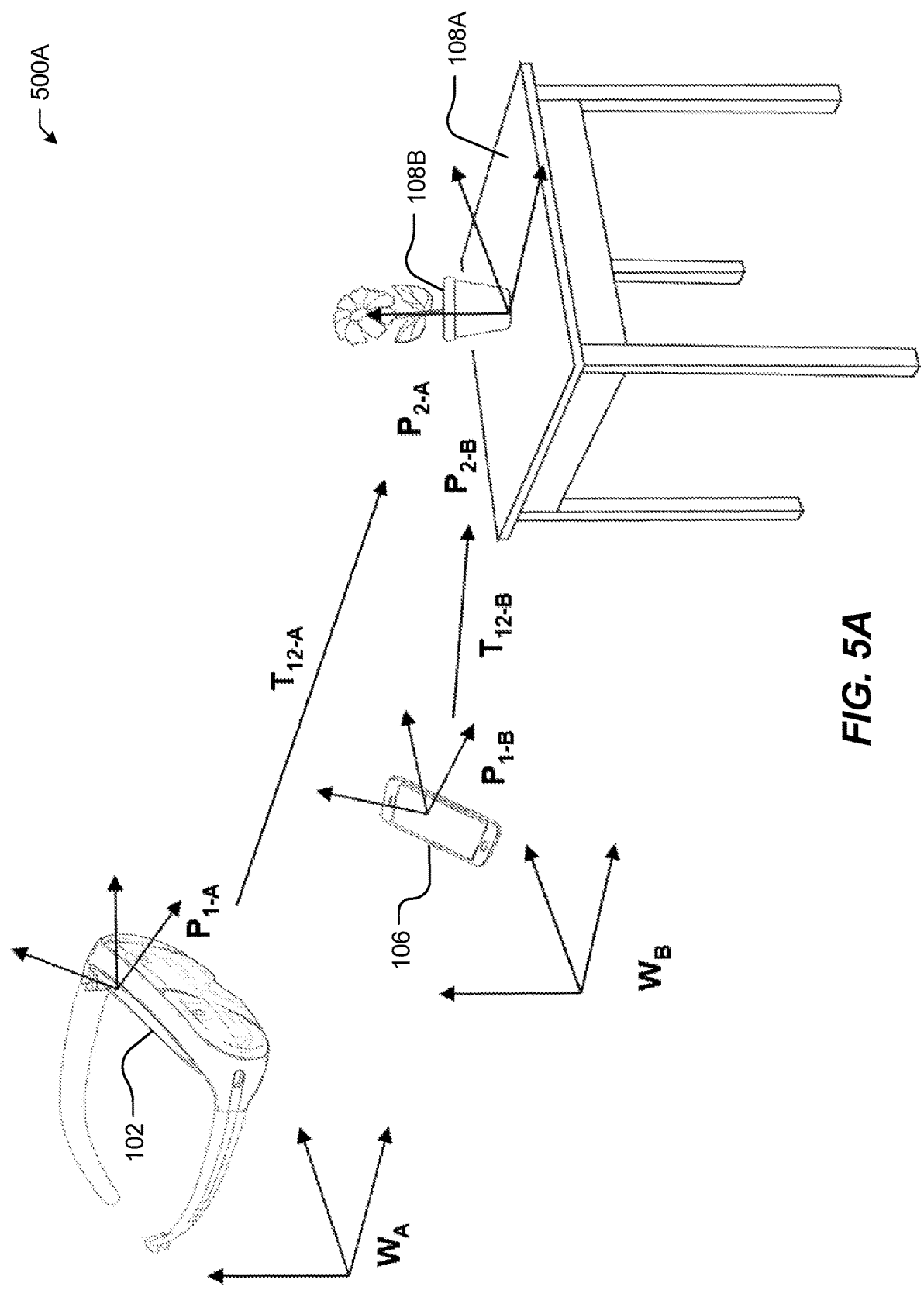
FIGS. 5A and 5B illustrate an XR display device and electronic device coordinate system for detecting and identifying objects.
Figure 5B:
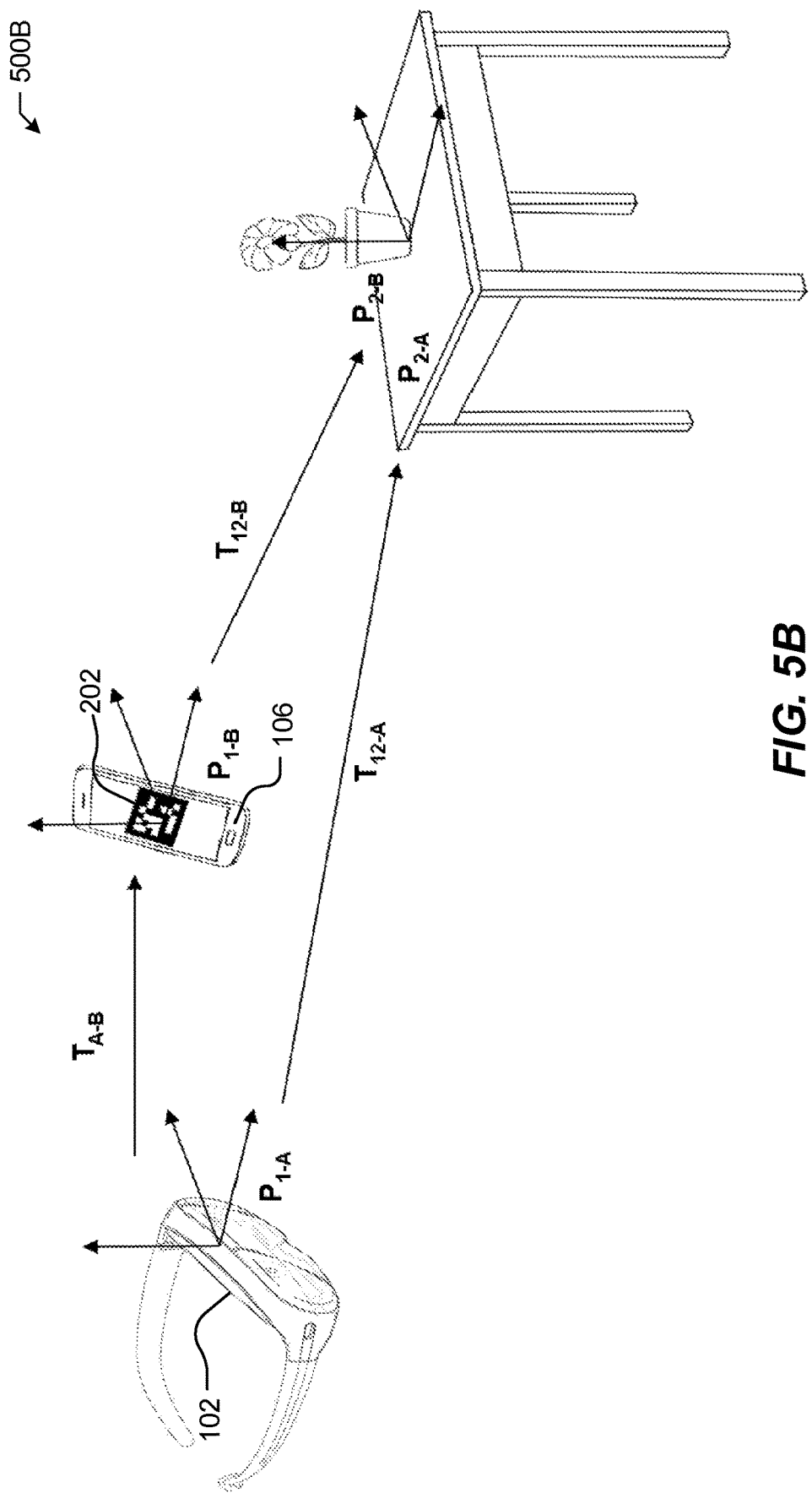

FIGS. 5A and 5B illustrate an XR display device and electronic device coordinate systems 500A and 500B for determining final image and depth map based on a first map and second map for creating and refining 3D point clouds and detecting and recognizing objects within an XR environment. In particular embodiments, as previously discussed above, the transformation $T_{1-A}$ and the transformation $T_{1-B}$ may each include, for example, a matrix that may be composed of a rotation R and t (e.g., in which the rotation R is expressed as a matrix and translation t may be expressed as a vector: T[R|t]). In particular embodiments, the XR display device pose $P_{1-A}$ and the electronic device pose $P_{1-B}$ may be calculated relative to the world coordinate system $W_A$ and the world coordinate system $W_B$, respectively. In particular embodiments, once the XR display device pose $P_{1-A}$ and the electronic device pose $P_{1-B}$ are calculated, the XR display device pose $P_{1-A}$ and the electronic device pose $P_{1-B}$ may be then utilized to calculate the relative transformation $T_{12-A}$ from the XR display device pose $P_{1-A}$ to the object pose $P_{2-A}$ and the relative transformation $T_{12-B}$ from the electronic device pose $P_{1-B}$ to the object pose $P_{2-B}$. Particularly, based on matrix arithmetic, the transformation $T_{12-A}$ from the XR display device pose $P_{1-A}$ to the object pose $P_{2-A}$ may be expressed as: $T_{12-A}=T_{A-B}T_{12-B}$. Similarly, based on matrix arithmetic, the transformation $T_{12-B}$ from the electronic device pose $P_{1-B}$ to the object pose $P_{2-B}$ may be expressed as: $T_{12-B}=T^{-1}_{12-A}T_{A-B}$. In particular embodiments, the relative transformation $T_{12-A}$ and the relative transformation $T_{12-B}$ may collectively indicate a 3D pose (e.g., $P_{2-A}$, $P_{2-B}$) of the object 108B that may be utilized to detect and identify the object 108B (e.g., as being flowerpot).

For example, as depicted in FIG. 5B, in particular embodiments, the electronic device 106 may perform one or more triangulation calculations (e.g., depth map calculations) to determine the object pose $P_{2-A}$ and the object pose $P_{2-B}$. In particular embodiments, as further illustrated, a triangle for calculation purposes may be formed that includes, for example, the transformation $T_{A-B}$, the transformation $T_{12-A}$, and the transformation $T_{12-B}$ as each of the 3 respective sides of the triangle. Thus, in example, based on the known poses $P_{1-A}$ and $P_{1-B}$ of the XR display device 102 and the electronic device 106 (e.g., relative to each other) and the transformations $T_{A-B}$, $T_{12-A}$, and $T_{12-B}$, the object pose $P_{2-A}$ and the object pose $P_{2-B}$ of the object 108B may be determined, and the object 108B may be then detected and identified (e.g., as being flowerpot). In this way, even in the case in which XR display device 102 includes only reduced processing power, low resolution optical sensors, and/or simplified tracking optics, the present techniques may nevertheless allow for accurate and precise object 108A, 108B detection and identification by utilizing the electronic device 106 to perform the more computationally expensive 3D pose and depth calculations and for simply sharing the finalized 3D map of the XR environment 100 between the electronic device 106 and the XR display device 102.

Figure 6:
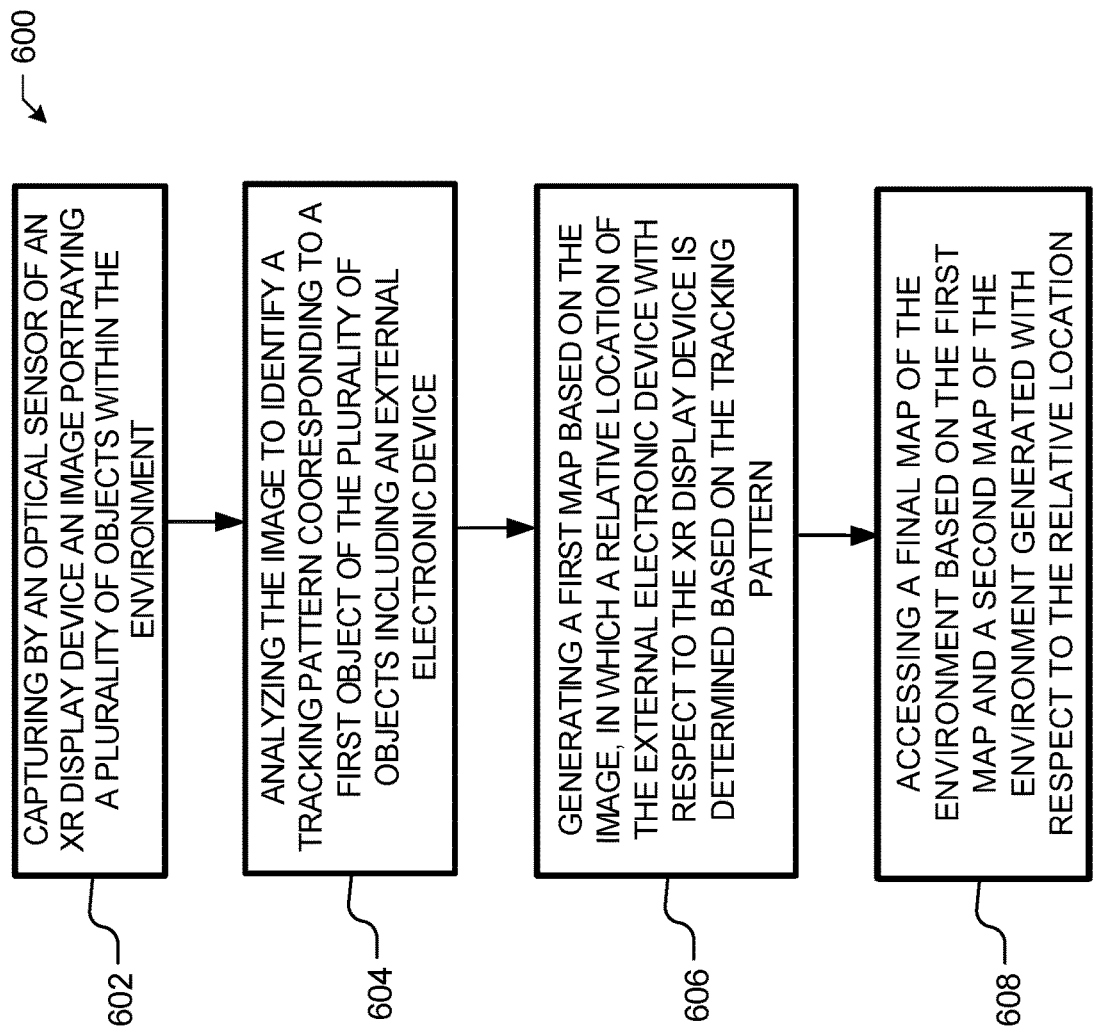
FIG. 6 is a flow diagram of a method for receiving a final depth map based on a first map and second map for detecting and recognizing objects within an XR environment.

FIG. 6 illustrates is a flow diagram of a method for receiving final image and depth map based on a first map and second map for creating and refining 3D point clouds and detecting and recognizing objects within an XR environment, in accordance with the presently disclosed embodiments. The method 600 may be performed utilizing one or more processing devices (e.g., XR display device 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D or 3D image data, software (e.g., instructions running/executing on one or more processors), firmware (e.g., microcode), or some combination thereof.

The method 600 may begin block 602 with the one or more processing devices (e.g., XR display device 102) capturing, by one or more optical sensors of an XR display device, one or more images portraying a number of objects within the environment. The method 600 may then continue at block 604 with the one or more processing devices (e.g., XR display device 102) analyzing the one or more images to identify a tracking pattern corresponding to a first object of the plurality of objects, wherein the first object is an external electronic device associated with the XR display device. The method 600 may then continue at block 606 with the one or more processing devices (e.g., XR display device 102) determining a first map of the environment based on the one or more images, in which a relative location of the external electronic device within the environment with respect to the XR display device is determined for the first map based on the tracking pattern.

In particular embodiments, the XR electronic device may generate the first map of the environment utilizing a synchronous localization and mapping (SLAM) process or other point cloud mapping process. In particular embodiments, the first map may include a first pose and a first transformation corresponding to the XR display device. The method 600 may then conclude at block 608 with the one or more processing devices (e.g., XR display device 102) accessing a final map of the environment based on the first map of the environment and a second map of the environment generated with respect to the relative location. In particular embodiments, the second map may include a second pose and a second transformation corresponding to the external electronic device. In particular embodiments, the first map may include a lower resolution as compared to the second map. In this way, even in the case in which XR display device includes only reduced processing power, low resolution optical sensors, and/or simplified tracking optics, the present techniques may nevertheless allow for accurate and precise object detection and identification by utilizing the electronic device to perform the more computationally expensive 3D pose and depth calculations and for simply sharing a finalized 3D map of the environment between the electronic device and the XR display device.

Figure 7:
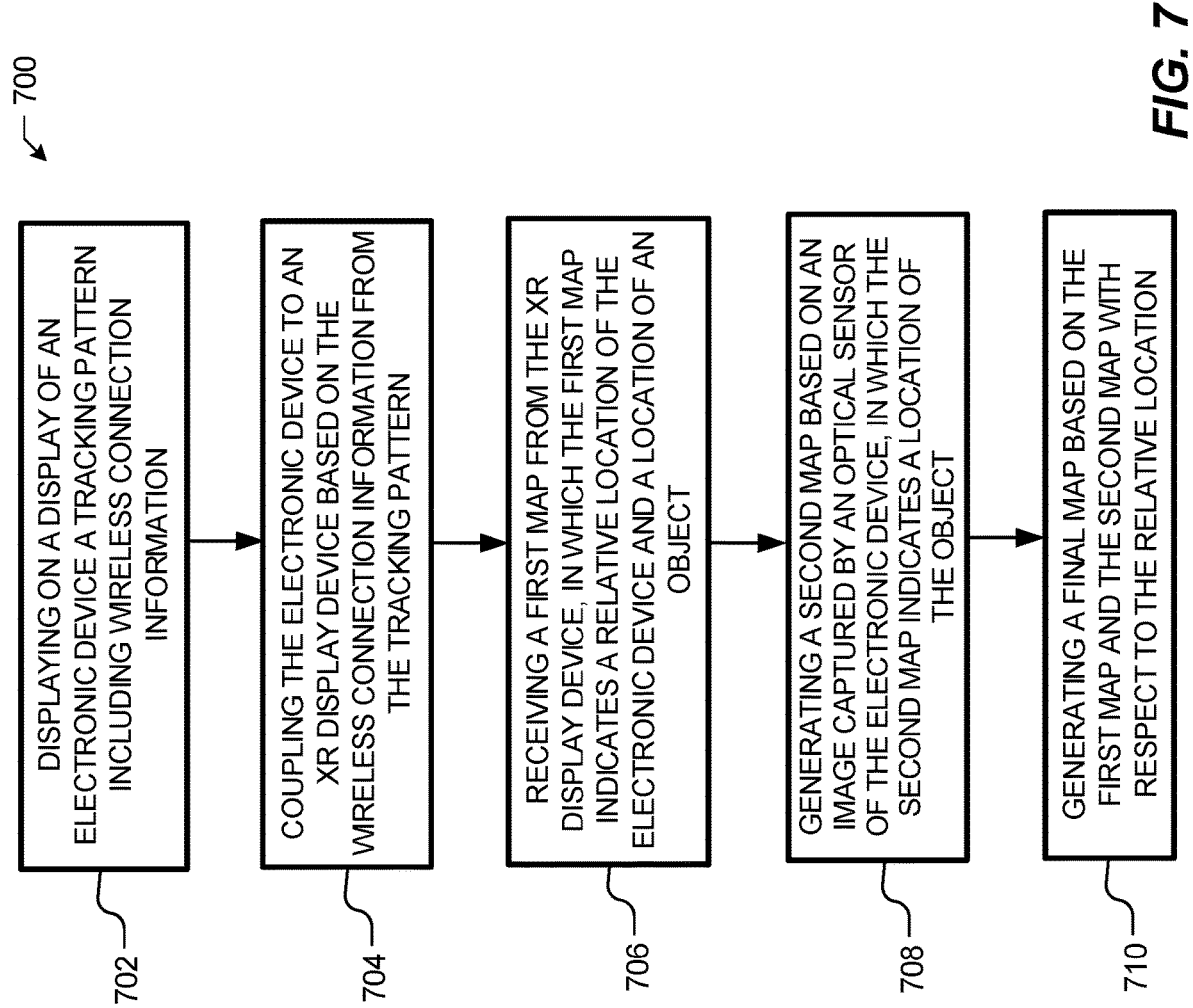
FIG. 7 is a flow diagram of a method for generating a final depth map based on a first map and second map for detecting and recognizing objects within an XR environment.

FIG. 7 illustrates is a flow diagram of a method for generating a final image and depth map based on a first map and second map for creating and refining 3D point clouds and detecting and recognizing objects within an XR environment, in accordance with the presently disclosed embodiments. The method 700 may be performed utilizing one or more processing devices (e.g., electronic device 106) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 700 may begin block 702 with the one or more processing devices (e.g., electronic device 106) displaying, on a display of an electronic device, a tracking pattern, in which the tracking pattern includes wireless connection information for coupling to the electronic device. In particular embodiments, the tracking pattern may include a pattern displayed within a center portion of a display area of the display of the electronic device. In particular embodiments, the tracking pattern may further include one or more sub-patterns displayed within a perimeter portion of the display area of the display of the electronic device. The method 700 may then continue at block 704 with the one or more processing devices (e.g., electronic device 106) coupling the electronic device to an XR display device based on the wireless connection information from the tracking pattern. The method 700 may then continue at block 706 with the one or more processing devices (e.g., electronic device 106) receiving a first map of an environment from the external XR display device, in which the first map indicates a relative location of the electronic device and locations of one or more objects within the environment with respect to the external XR display device. In particular embodiments, the first map may include a first pose and a first transformation corresponding to the external XR display device.

The method 700 may then continue at block 708 with the one or more processing devices (e.g., electronic device 106) generating a second map of the environment based on one or more images captured by one or more optical sensors of the electronic device, in which the second map indicates locations of the one or more objects within the environment with respect to the electronic device. In particular embodiments, the second map may include a second pose and a second transformation corresponding to the electronic device. The method 700 may then conclude at block 710 with the one or more processing devices (e.g., electronic device 106) generating a final map of the environment based on the first map and the second map with respect to the relative location. In particular embodiments, the electronic device may generate the final map of the environment may perform, for each of the one or more objects, one or more triangulation calculations based on the first map and the second map to determine a first pose and a second pose of the respective object. In this way, even in the case in which XR display device includes only reduced processing power, low resolution optical sensors, and/or simplified tracking optics, the present techniques may nevertheless allow for accurate and precise object detection and identification by utilizing the electronic device to perform the more computationally expensive 3D pose and depth calculations and for simply sharing a finalized 3D map of the environment between the electronic device and the XR display device.

Figure 8:
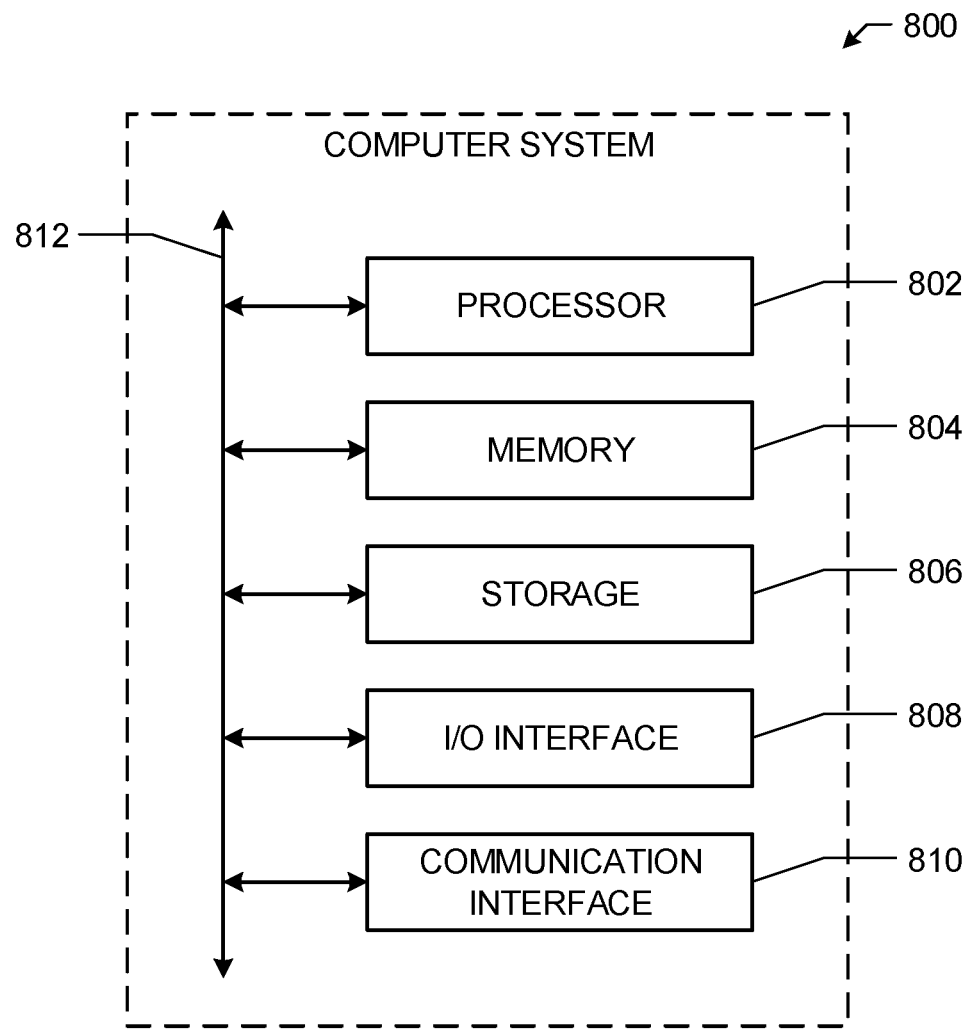
FIG. 8 illustrates an example computer system.

FIG. 8 illustrates an example computer system 800 that may be utilized for re-projecting depth maps on user electronic devices, in accordance with the presently disclosed embodiments. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks.

Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802.

Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example, and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere).

One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example, and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still optical sensor, stylus, tablet, touch screen, trackball, video optical sensor, another suitable I/O device or a combination of two or more of these. An I/O device may include one or more sensors. This disclosure contemplates any suitable I/O devices and any suitable I/O interfaces 806 for them. Where appropriate, I/O interface 808 may include one or more device or software drivers enabling processor 802 to drive one or more of these I/O devices. I/O interface 808 may include one or more I/O interfaces 806, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it.

As an example, and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example, and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, may be claimed in another claim category, e.g. system, as well. The dependencies or references back in the attached claims are chosen for formal reasons only. However, any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an extended reality (XR) display device:
    capturing, by one or more optical sensors of the XR display device, one or more images portraying a plurality of objects within an environment;
    analyzing the one or more images to identify a tracking pattern corresponding to a first object of the plurality of objects, wherein the first object is an external electronic device associated with the XR display device, wherein the external electronic device is inside a view of scene of the one or more optical sensors of the XR display device, and wherein the XR display device is outside a view of scene of one or more optical sensors of the external electronic device;
    generating a first map of the environment based on the one or more images, wherein a relative location of the external electronic device within the environment with respect to the XR display device is determined for the first map based on the tracking pattern, wherein the first map comprises the first object and one or more second objects of the plurality of objects; and
    accessing a final map of the environment based on the first map of the environment and a second map of the environment generated with respect to the relative location, wherein the second map comprises the one or more second objects of the plurality of objects, and wherein the final map comprises a depth map including the one or more second objects of the plurality of objects within the environment.

2. The method of claim 1, further comprising:
providing the first map of the environment to the external electronic device;
receiving the final map of the environment from the external electronic device; and
storing the final map of the environment to one or more data stores of the XR display device;
wherein accessing the final map comprises accessing the final map stored on the XR display device.

3. The method of claim 1, further comprising:
receiving the second map of the environment from the external electronic device;
generating the final map of the environment based on the first map and the second map; and
storing the final map of the environment to one or more data stores of the XR display device;
wherein accessing the final map comprises accessing the final map stored on the XR display device.

4. The method of claim 1, wherein the first map comprises a first pose and a first transformation corresponding to the XR display device, and wherein the second map comprises a second pose and a second transformation corresponding to the external electronic device.

5. The method of claim 1, wherein the final map of the environment comprises, for each second object of the one or more second objects, a map of a first pose and a second pose of the respective second object.

6. An extended reality (XR) display device comprising:
one or more displays;
one or more optical sensors;
one or more non-transitory computer-readable storage media including instructions; and
one or more processors coupled to the storage media, the one or more processors configured to execute the instructions to:
capture, by the one or more optical sensors of the XR display device, one or more images portraying a plurality of objects within an environment;
analyze the one or more images to identify a tracking pattern corresponding to a first object of the plurality of objects, wherein the first object is an external electronic device associated with the XR display device, wherein the external electronic device is inside a view of scene of the one or more optical sensors of the XR display device, and wherein the XR display device is outside a view of scene of one or more optical sensors of the external electronic device;
generate a first map of the environment based on the one or more images, wherein a relative location of the external electronic device within the environment with respect to the XR display device is determined for the first map based on the tracking pattern, wherein the first map comprises the first object and one or more second objects of the plurality of objects; and
access a final map of the environment based on the first map of the environment and a second map of the environment generated with respect to the relative location, wherein the second map comprises the one or more second objects of the plurality of objects, and wherein the final map comprises a depth map including the one or more second objects of the plurality of objects within the environment.

7. The XR display device of claim 6, wherein the instructions further comprise instructions to:
provide the first map of the environment to the external electronic device;
receive the final map of the environment from the external electronic device; and
store the final map of the environment to one or more data stores of the XR display device;
wherein accessing the final map comprises accessing the final map stored on the XR display device.

8. The XR display device of claim 6, wherein the instructions further comprise instructions to:
receive the second map of the environment from the external electronic device;
generate the final map of the environment based on the first map and the second map; and
store the final map of the environment to one or more data stores of the XR display device;
wherein accessing the final map comprises accessing the final map stored on the XR display device.

9. The XR display device of claim 6, wherein the first map comprises a first pose and a first transformation corresponding to the XR display device, and wherein the second map comprises a second pose and a second transformation corresponding to the external electronic device.

10. The XR display device of claim 6, wherein the final map of the environment comprises, for each second object of the one or more second objects, a map of a first pose and a second pose of the respective second object.

11. A non-transitory computer-readable medium comprising instructions that, when executed by one or more processors of an extended reality (XR) display device, cause the one or more processors to:
capture, by the one or more optical sensors of the XR display device, one or more images portraying a plurality of objects within an environment;
analyze the one or more images to identify a tracking pattern corresponding to a first object of the plurality of objects, wherein the first object is an external electronic device associated with the XR display device, wherein the external electronic device is inside a view of scene of the one or more optical sensors of the XR display device, and wherein the XR display device is outside a view of scene of one or more optical sensors of the external electronic device;
generate a first map of the environment based on the one or more images, wherein a relative location of the external electronic device within the environment with respect to the XR display device is determined for the first map based on the tracking pattern, wherein the first map comprises the first object and one or more second objects of the plurality of objects; and
access a final map of the environment based on the first map of the environment and a second map of the environment generated with respect to the relative location, wherein the second map comprises the one or more second objects of the plurality of objects, and wherein the final map comprises a depth map including the one or more second objects of the plurality of objects within the environment.

12. The non-transitory computer-readable medium of claim 11, wherein the instructions further comprise instructions to:
provide the first map of the environment to the external electronic device;

receive the final map of the environment from the external electronic device; and store the final map of the environment to one or more data stores of the XR display device;

wherein accessing the final map comprises accessing the final map stored on the XR display device.

13. The non-transitory computer-readable medium of claim 11, wherein the instructions further comprise instructions to:

receive the second map of the environment from the external electronic device;

generate the final map of the environment based on the first map and the second map; and store the final map of the environment to one or more data stores of the XR display device;

wherein accessing the final map comprises accessing the final map stored on the XR display device.

14. The non-transitory computer-readable medium of claim 11, wherein the first map comprises a first pose and a first transformation corresponding to the XR display device, and wherein the second map comprises a second pose and a second transformation corresponding to the external electronic device.

15. The non-transitory computer-readable medium of claim 11, wherein the final map of the environment comprises, for each second object of the one or more second objects, a map of a first pose and a second pose of the respective second object.

16. A method comprising, by an electronic device:

displaying, on a display of the electronic device, a tracking pattern, wherein the tracking pattern comprises wireless connection information for coupling to the electronic device;

coupling the electronic device to an external extended reality (XR) display device based on the wireless connection information from the tracking pattern, wherein the electronic device is inside a view of scene of one or more optical sensors of the external XR display device, and wherein the external XR display device is outside a view of scene of one or more optical sensors of the electronic device;

receiving a first map of an environment from the external XR display device, wherein the first map comprises the electronic device and one or more second objects of a plurality of objects and indicates a relative location of the electronic device and locations of the one or more second objects within the environment with respect to the external XR display device;

generating a second map of the environment based on one or more images captured by the one or more optical sensors of the electronic device, wherein the second map comprises the one or more second objects of the plurality of objects and indicates locations of the one or more second objects within the environment with respect to the electronic device; and generating a final map of the environment based on the first map and the second map with respect to the relative location, wherein the final map comprises a depth map of the locations of the one or more second objects within the environment.

17. The method of claim 16, wherein the tracking pattern comprises a pattern displayed within a center portion of a display area of the display of the electronic device.

18. The method of claim 17, wherein the tracking pattern further comprises one or more sub-patterns displayed within a perimeter portion of the display area of the display of the electronic device.

19. The method of claim 16, wherein the first map comprises a first pose and a first transformation corresponding to the external XR display device, and wherein the second map comprises a second pose and a second transformation corresponding to the electronic device.

20. The method of claim 16, wherein generating the final map of the environment comprises performing, for each of the one or more second objects, one or more triangulation calculations based on the first map and the second map to determine a first pose and a second pose of the respective second object.

21. An electronic device comprising:

a display;

one or more optical sensors;

one or more non-transitory computer-readable storage media including instructions; and one or more processors coupled to the storage media, the one or more processors configured to execute the instructions to:

display, on the display of the electronic device, a tracking pattern, wherein the tracking pattern comprises wireless connection information for coupling to the electronic device;

couple the electronic device to an external extended reality (XR) display device based on the wireless connection information from the tracking pattern, wherein the electronic device is inside a view of scene of one or more optical sensors of the external XR display device, and wherein the external XR display device is outside a view of scene of the one or more optical sensors of the electronic device;

receive a first map of an environment from the external XR display device, wherein the first map comprises the electronic device and one or more second objects of a plurality of objects and indicates a relative location of the electronic device and locations of the one or more second objects within the environment with respect to the external XR display device;

generate a second map of the environment based on one or more images captured by the one or more optical sensors of the electronic device, wherein the second map comprises the one or more second objects of the plurality of objects and indicates locations of the one or more second objects within the environment with respect to the electronic device; and generate a final map of the environment based on the first map and the second map with respect to the relative location, wherein the final map comprises a depth map of the locations of the one or more second objects within the environment.

22. The electronic device of claim 21, wherein the tracking pattern comprises a pattern displayed within a center portion of a display area of the display of the electronic device.

23. The electronic device of claim 22, wherein the tracking pattern further comprises one or more sub-patterns displayed within a perimeter portion of the display area of the display of the electronic device.

24. The electronic device of claim 21, wherein the first map comprises a first pose and a first transformation corresponding to the external XR display device, and wherein the second map comprises a second pose and a second transformation corresponding to the electronic device.

25. The electronic device of claim 21, wherein the instructions to generate the final map of the environment further comprise instructions to perform, for each of the one or more second objects, one or more triangulation calculations based on the first map and the second map to determine a first pose and a second pose of the respective second object.

26. A non-transitory computer-readable medium comprising instructions that, when executed by one or more processors of an electronic device, cause the one or more processors to:
- display, on a display of the electronic device, a tracking pattern, wherein the tracking pattern comprises wireless connection information for coupling to the electronic device;
- couple the electronic device to an external extended reality (XR) display device based on the wireless connection information from the tracking pattern, wherein the electronic device is inside a view of scene of one or more optical sensors of the external XR display device, and wherein the external XR display device is outside a view of scene of one or more optical sensors of the electronic device;
- receive a first map of an environment from the external XR display device, wherein the first map comprises the electronic device and one or more second objects of a plurality of objects and indicates a relative location of the electronic device and locations of the one or more second objects within the environment with respect to the external XR display device;
- generate a second map of the environment based on one or more images captured by the one or more optical sensors of the electronic device, wherein the second map comprises the one or more second objects of the plurality of objects and indicates locations of the one or more second objects within the environment with respect to the electronic device; and
- generate a final map of the environment based on the first map and the second map with respect to the relative location, wherein the final map comprises a depth map of the locations of the one or more second objects within the environment.

27. The non-transitory computer-readable medium of claim 26, wherein the tracking pattern comprises a pattern displayed within a center portion of a display area of the display of the electronic device.

28. The non-transitory computer-readable medium of claim 27, wherein the tracking pattern further comprises one or more sub-patterns displayed within a perimeter portion of the display area of the display of the electronic device.

29. The non-transitory computer-readable medium of claim 26, wherein the first map comprises a first pose and a first transformation corresponding to the external XR display device, and wherein the second map comprises a second pose and a second transformation corresponding to the electronic device.

30. The non-transitory computer-readable medium of claim 26, wherein the instructions to generate the final map of the environment further comprise instructions to perform, for each of the one or more second objects, one or more triangulation calculations based on the first map and the second map to determine a first pose and a second pose of the respective second object.

* * * * *